Jan. 27, 1970 L. G. SCHIMPF 3,492,432

PULSE AMPLITUDE MODULATION MULTIPLEX VIDEO TRANSMISSION SYSTEM

Filed March 8, 1967 3 Sheets-Sheet 1

INVENTOR
L. G. SCHIMPF
BY John K. McIlvaney
ATTORNEY

United States Patent Office 3,492,432

Patented Jan. 27, 1970

3,492,432

PULSE AMPLITUDE MODULATION MULTIPLEX VIDEO TRANSMISSION SYSTEM

Luther G. Schimpf, Holmdel, N.J., assignor to Bell Telephone Laboratories, Incorporated, Murray Hill and Berkeley Heights, N.J., a corporation of New York Filed Mar. 8, 1967, Ser. No. 621,527
Int. Cl. H04j 1/18
U.S. Cl. 179—15 1 Claim

ABSTRACT OF THE DISCLOSURE

This disclosure relates to a pulse amplitude modulation multiplexing arrangement for a plurality of video-type signals. The plurality of video signals are individually and simultaneously encoded into pulse code modulation (PCM) signals. The output of each encoder is then sampled; corresponding time-coincident serial output bits of the encoders are sampled in a predetermined sequence. Each group of successively sampled bits is then converted into a quantized pulse amplitude modulated (PAM) signal which is representative of the sampled group of PCM bits. The PAM signal is transmitted to the receiving terminal where it is decoded into a plurality of respective PCM signals having bit patterns identical to those of the transmitter encoders. The PCM signals of each channel are then decoded in order to recover the original video signals.

BACKGROUND OF THE INVENTION

This invention relates to electrical message transmission systems and, more particularly, to a pulse amplitude modulation system for the transmission of plural video signals over a single transmission channel.

The bulk of long distance circuits used in today's telephone industry are substantially wideband, analog channels (e.g. coaxial cable and radio relay systems). The bandwidth allows a great number of telephone conversations to be carried by a single facility. Each voice frequency speech signal normally modulates a given carrier to develop a signal which is frequency multiplexed with other modulated carriers of different frequency to form a multiplex "group." This broadband group is then transmitted over a single analog channel. This arrangement is quite satisfactory for normal telephone conversations. However, when video signals are multiplexed in this manner, intermodulation distortion due to system non-linearity is encountered. The subjective effect of said intermodulation distortion on the video signals is quite noticeable to viewers of the video signals.

While multiplexing video signals by time division multiplexing using pulse code modulation (PCM) is quite satisfactory from the standpoint of distortion, the bandwidth requirements are quite substantial and prohibitive in some cases.

SUMMARY OF THE INVENTION

It is accordingly an object of the present invention to combine a plurality of video signals in such a manner that they may be transmitted over a single wideband analog facility without creating intermodulation distortion.

It is a further object of the invention to transmit a plurality of video signals over a single channel with a considerable saving in bandwidth requirements.

The invention relates to a system for pulse amplitude modulation multiplexing of a plurality of video-type signals. The plurality of video signals are individually and simultaneously encoded into PCM signals. The output of each encoder is then sampled; the corresponding time-coincident serial output bits of the encoders are sampled in a predetermined sequence. Each group of successively sampled bits is then converted into a quantized pulse amplitude modulated PAM signal which is representative of the sampled group of PCM bits. The PAM signal is transmitted to the receiving terminal where it is decoded into a plurality of respective PCM signals having bit patterns identical to those of the transmitter encoders. The PCM signals of each channel are then decoded in order to recover the original video signals.

It is a feature of the present invention that the proposed system is more flexible than some of the time division and other pulse techniques employed in the past because the proposed systems allows a trade off between the number of digits used in the pulse code modulation systems (PCM) employed and the number of channels multiplexed. That is, if fewer PCM digits are used, more video channels can be transmitted over a given common transmission path.

DETAILED DESCRIPTION

Figure 1:
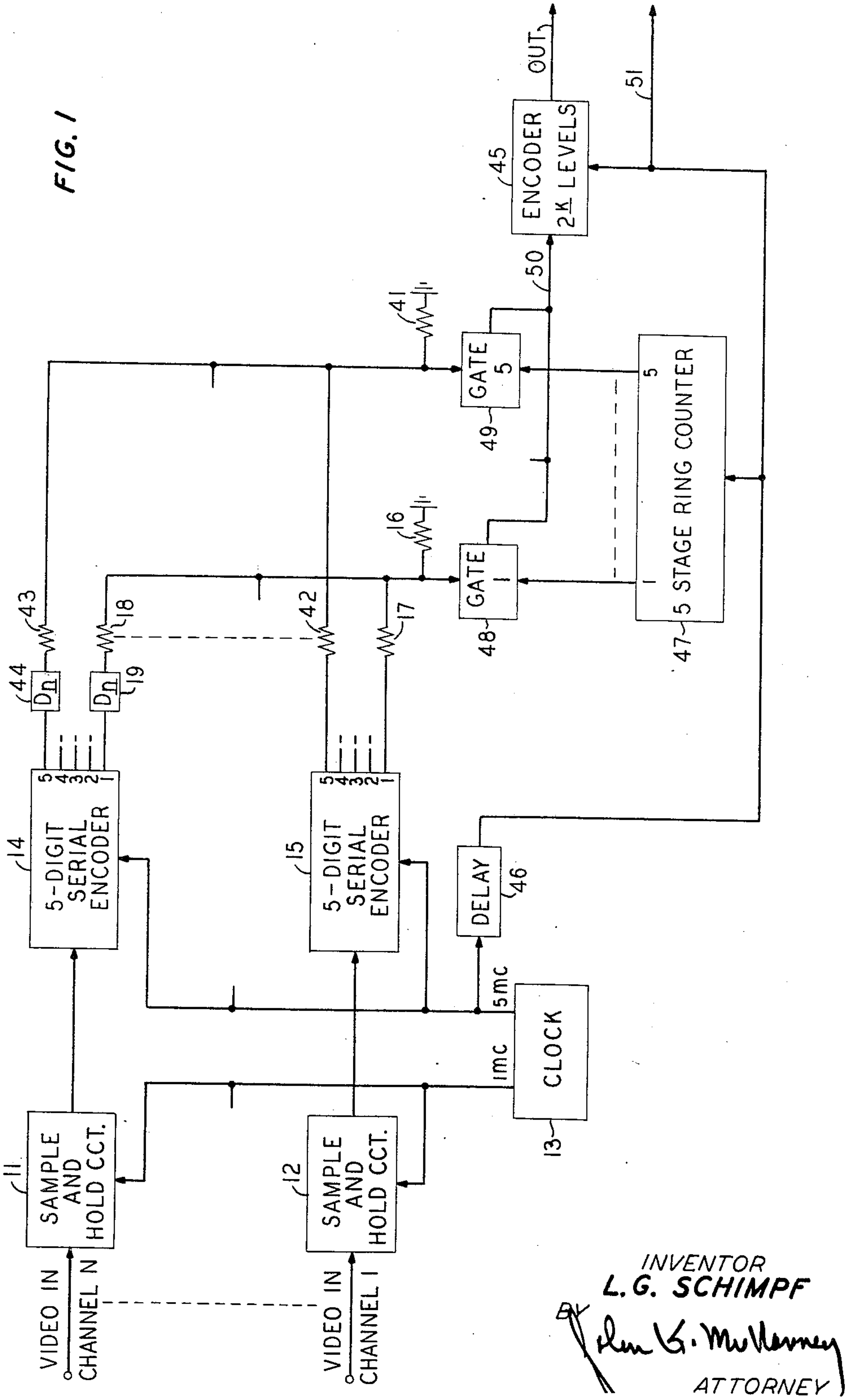
FIG. 1 illustrates a simplified schematic block diagram of a transmitting terminal in accordance with the invention.

Considering now FIG. 1 in detail, a plurality of respective video input signals 1, . . . N are delivered to their respective sample and hold circuits such as circuits 11 and 12, respectively. These video signals may be Picturephone®, visual telephone systems. The sample and hold circuits may be any type known in the art. The sampling takes place at a one megacycle rate under the control of a one megacycle signal derived from the transmitting timing clock 13. The sampled signals are then respectively delivered to their respective five-digit serial encoders such as encoders 14 and 15. Here again these encoders may be of any type known in the art. The encoders are operated under the control of a 5 megacycle signal which is also derived from the clock 13.

For purposes of the present invention it shall be assumed that three picturephone signals are transmitted over the common transmission link and five-digit serial encoders are utilized. It should be clear, however, that these values are chosen only for the purpose of simplifying the description of the operation of the present invention. For example, it is entirely possible to transmit four picturephone signals over the common transmission link using five-digit serial encoders and, as will be more apparent hereinafter, the proposed system is flexible in that it allows a trade-off between the number of digits used in the encoders employed and the number of video channels multiplexed. Thus, the fewer PCM digits used the more video channels can be transmitted over a common transmission link.

The respective encoders serially deliver "1" and "0" output signals on their 1 through 5 output leads in accordance with the amplitude of the video signals sampled. The first serial digit output of encoder 15 is directly connected to the summing resistor 16 via the isolating resistor 17; while the first digit output of the encoder 14 is delivered to said summing resistor 16 via the isolating resistor 18 and a delay $D_n$ 19. The delay in the latter is slightly less than 0.2 microsecond in length. The output of the intermediate encoder, or encoders as the case may be, is delayed by an appropriate amount intermediate between zero and 0.2 microsecond. In a similar manner the fifth digit output of encoder 15 is delivered to the summing resistor 41 via the isolating resistor 42; the fifth digit output of encoder 14 is also delivered to summing resistor 41 via the isolating resistor 43 and delay $D_n$. This latter delay is likewise 0.2 microsecond. In a similar fashion, the second, third and fourth digits of the encoders are delivered to their respective summing resistors via respective isolating resistors and delays, the latter delays being the appropriate amounts intermediate between zero and 0.2 microsecond.

Since the plurality of video signals are individually and simultaneously encoded into PCM signals and are respectively delayed as indicated, they can be sampled in sequence. Thus, the corresponding time-coincident serial output bits of the encoders are sampled in a predetermined sequence, the output of encoder 15 being sampled first and the output of encoder 14 last. Each group of successively sampled bits is then converted into a quantized pulse amplitude modulated (PAM) signal, in a manner to be described, which is representative of a sampled group of PCM bits.

Because the encoders are serial, the first digits from all encoders are examined by the encoder 45 before the second digits, and so on. The PAM code pattern is determined by separating the pulses in time, this being accomplished by using different delays as described, from each encoder before the pulses are PAM added. As indicated, the delay from encoder 15 is essentially zero and that of encoder 14 substantially 0.2 microsecond for each of the 5 bits.

Returning again to FIG. 1, the 5 megacycle signal from clock 13 is delayed in delay 46 and then applied to the the five-stage ring counter 47. The delay 46 is equivalent to that encountered in the encoders 14–15. Running at a 5 megacycle rate, the ring counter 47 delivers a signal of 0.2 microsecond to each of its output leads 1 through 5. Accordingly, gate "one" 48 is open for a period of 0.2 microsecond, as is gate "five" 49 and the intervening gates two, three, and four (not shown). Thus, the "1" and "0"-output signals of the PCM encoders are respectively and serially passed via gate one to the $2^k$ level ($k=N$) encoder 45. Accordingly, during this first digit interval, gate one is opened by the ring counter 47 and the digital pattern from the encoders is encoded into one of $2^N$ amplitude levels by the encoder 45. The manner in which this is accomplished will be described hereinafter. All possible combinations of the first digits from the N PCM encoders are represented by the $2^N$ amplitude levels. The five-stage ring counter then steps to the second position and the second serial digits of the encoders are successively delivered from their summing resistor (not shown) via the respective gate two (not shown). The second serial digits are then in turn encoded into one of $2^N$ levels. When the five-stage ring counter steps to its last or fifth position, the gate 49 is opened for a 0.2 microsecond interval and the serial "1" and "0" outputs of the encoders are respectively coupled from the summing resistor 41 via gate five to the encoder 45. This process is then repeated. The fifth digits of the encoders are serially coupled to the summing resistor 41 and thence via the enabled gate 49 to the encoder 45. The fifth digits of the encoders are serially coupled to the summing resistor 41 in accordance with the respective delays interposed in their paths. These delays will extend from zero for the fifth digit from encoder 15 to 0.2 microsecond for the fifth digit from encoder 14. The fifth digits of the intermediate decoders are appropriately delayed by respective amounts so that they are in their turn serially delivered to the summing resistor 41. All of the fifth digits of the plurality of encoders are delivered to the resistor 41 in the period of 0.2 microsecond.

Figure 2:
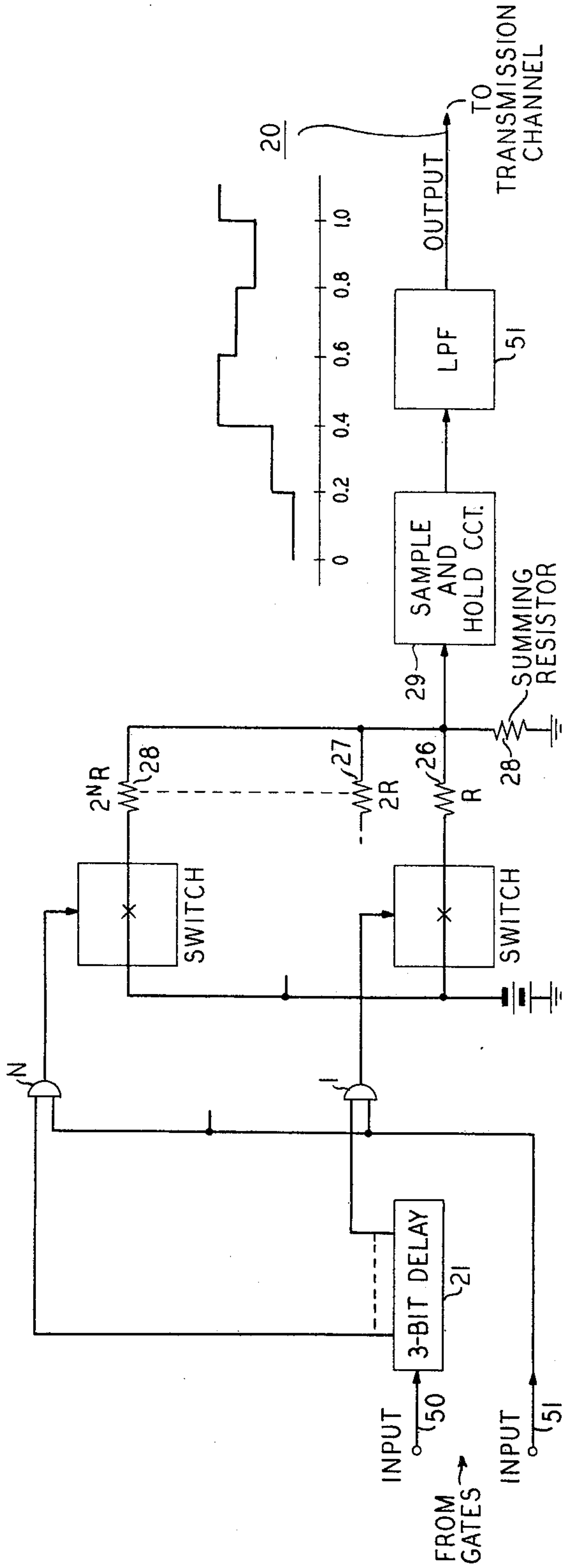
FIG. 2 shows a more detailed drawing of the "$2^k$ level encoder" of FIG. 1.

Turning now to FIG. 2, the encoder 45 is shown in greater detail. When each of gates 1 through 5 is closed in sequence each digital group pattern of three bits is applied to lead 50 in sequence. The pattern formed by the first digits from the assumed illustrative embodiment of three PCM encoders will occupy the first 0.2 microsecond, which is followed by the second digit group pattern during the next 0.2 microsecond, and so on. This requires one microsecond at which time the process is repeated.

If N equals three, then three channels may be pulse amplitude modulated multiplexed in the described manner. When N equals three, the output to the common transmission channel comprises a PAM signal of eight signal levels which can be readily detected at the receiving end. The $2^N$ quantized levels represent all combinations of the "1" and "0" digits of the N-encoders (e.g., the eight levels from the three decoders would be represented by one of the following bit formations: 000,001, 010, 011, 100, 101, 110, and 111).

Referring now to FIG. 2, the output signals from gates 1 through 5 are applied to the 0.2 microsecond, 3-bit delay 21 via the lead 50. The equally spaced taps on the delay line 21 are, of course, equal in number to the number of digital serial encoders 14–15 (e.g. 3, in this case). Accordingly, at the end of the first 0.2 microsecond period, the first 3-bit digit pattern will be stored in the delay line 21, the time slot associated with video channel 1 being stored near the output terminal of the line and the time slot associated with video channel N stored near the input terminal of the delay line. At this time a pulse is applied to lead 51 from the clock 13 via the delay 46. The pulse appearing on lead 51 enables the AND gates 1 . . . N. Accordingly, if a "1" bit is stored in delay line 21 it will be passed by its respective AND gate to its associated switch such as switches 23 and 24. The switches 23 and 24 are symbolically illustrated as relay *make* contact switches, although in practice electronic switches would be utilized. Accordingly, with a "1" output from its associated AND gate, the related switch will make contact and apply a voltage from battery 25 through one or more of the resistors 26, 27, and 28. In this manner the "1" and "0" digits stored in delay 21 are converted to an analog signal across summing resistor 28. As explained heretofore, the analog signal across summing resistor 28 can assume one of a plurality of quantized PAM signals, which is indicative of a sampled pulse pattern from the encoders 14 . . . 15.

The PAM analog output signal across the summing resistor 28 is then applied to a sample and hold circuit so that the transmitting terminal continues to send a given signal level until the output across the summing resistor assumes a new value. The output of the sample and hold circuit 29 is next applied to the outgoing common transmission channel via the low pass filter 51 which serves the purpose of eliminating unwanted harmonics. A typical pulse amplitude modulated (PAM) signal is indicated at 20 in FIG. 2.

Figure 3:
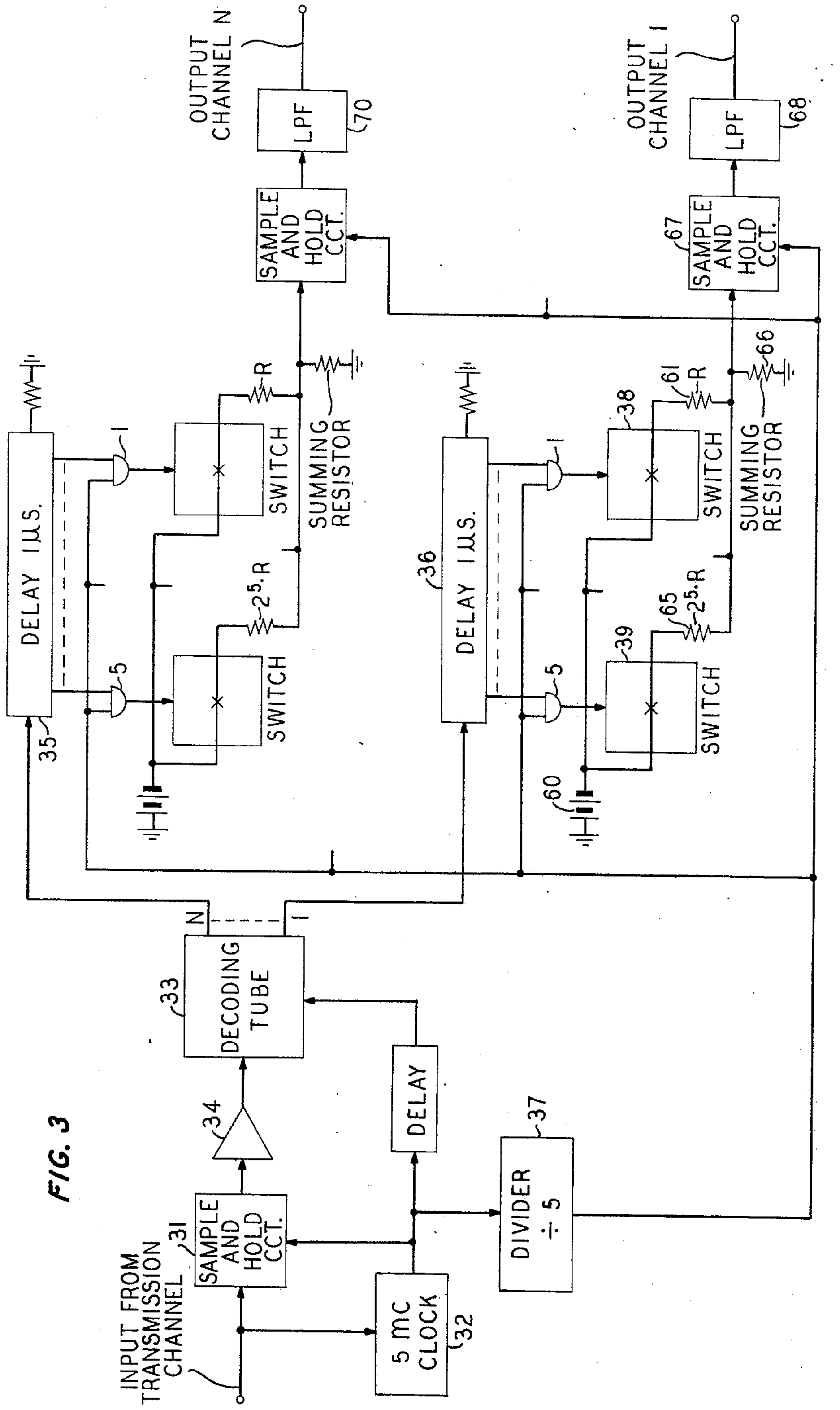
FIG. 3 illustrates in a simplified schematic block diagram a receiving terminal in accordance with the present invention.

In the receiver, FIG. 3, the $2^N$ amplitude PAM signals transmitted over the common transmission channel are delivered to a sample and hold circuit 31. These input signals are also applied to the receiver timing clock 32 for purposes of synchronizing the same in a manner well known in the art. The clock 32 is designed to run at a 5 megacycle rate. The sample and hold circuit 31 converts the incoming signal to a pulse amplitude sequence which is a reproduction of the transmitted signal before it is band-limited by the low pass filter and common transmission system. The output of the sample and hold circuit 31 is then delivered to the decoding tube 33 via the vertical deflection amplifier 34. Decoding tube 33 is of a type well known in the art and it comprises a cathode ray tube and an appropriate mask for converting the PAM signals to appropriate PCM signals. The coding tube of the patent to Gray, 2,632,058, issued Mar. 17, 1938, is in essence the same as the instant decoding tube. In Gray, however, the decoding tube converts an analog signal to a binary signal while the instant decoding tube 33 performs the converse operation. In essence, the output of the vertical deflection amplifier 34 develops a signal for vertically deflecting the cathode ray beam in accordance with the amplitude of the successively received PAM signals. The "1" and "0" three-digit output signals from the coding tube 1 . . . N are applied to their respective delay lines such as delay lines 35 . . . 36. Since the signal sample is sampled every 0.2 microsecond, a 5-bit word is delivered to each delay line every microsecond. The delay lines in turn are of one microsecond delay and are terminated by a resistance equivalent to the characteristic impedance of the delay line. In this manner, the serial 5-digit output signals of the N encoders are delivered to their respective one microsecond delay lines, such as lines 35 and 36.

Considering now the successive 5-bit output signals of encoder 15, these are stored in the one microsecond delay line 36. The delay line 36 is of one microsecond delay since each bit or time slot associated with encoder 15 is sampled every 0.2 microsecond. The first digit output of encoder 15 will be stored near the output terminal of the delay line, while the fifth digit output of the encoder 15 will be stored near the input terminal of the delay line. The intervening digits 2, 3, and 4 will be stored at predetermined intervening positions. The five digits stored in delay line 36 are then simultaneously read out therefrom under the control of an enabling signal derived from the ÷5 divider 37. The divider receives its input from the 5 megacycle clock and since the same is divided by five it delivers an enabling signal every microsecond. This enabling signal enables the AND gates 1 . . . 5.

The stored 5-bit pattern from encoder 15 is then converted to an analog signal by a method identical to that heretofore described in connection with the transmitting terminal. The switches 38 and 39 are symbolically illustrated as relay *make* contact switches, although, here again, in practice electronic switches, such as AND gates, would most likely be utilized. Accordingly with a "1" output from its associated AND gate, the related switch will make contact and apply a voltage from battery 60 through one or more of the resistors 61 . . . 65. In this manner the "1" *and* "0" digit ouptut signals from the encoder 15 which are subsequently stored in delay line 36, are converted to an analog signal across the summing resistor 66. Since the resistors 61 . . . are weighted in a manner similar to the weighting of the similar resistors in the 5-digital serial encoder 15, the analog signal generated across the summing resistor 66 is similar to the analog sample delivered to the encoder 15 from the sample and hold circuit 12. The signal across the summing resistor 66 is then delivered to the sample and hold circuit 67 and thence to video channel 1 via the low pass filter 68. The low pass filter 68 serves the purpose of eliminating unwanted harmonics.

As will be evident from the drawing, the circuitry associated with the N channel at the receiver is identical to that associated with channel 1 described supra. Accordingly, an appropriate analog output signal is similarly delivered to the video channel N from the low pass filter 70. Similarly, the intervening channels between channels 1 . . . N are handled at the receiver in the same manner as described and they in turn deliver their respective analog output signals to the appropriate video channels.

It should be understood that the above described embodiment is merely illustrative of the applications of the principles of the present invention. Accordingly, it will be clear that numerous other embodiments and modifications may be devised by those skilled in the art without departing from the spirit and scope of the invention.

What is claimed is:

1. A video signal pulse amplitude modulation multiplex system comprising a plurality of N channels or sources of video signals, means for individually and simultaneously encoding said video signals into corresponding n-digit pulse code modulated signals, means for sampling the encoded signals, the corresponding time-coincident encoded signals being sampled in a given predetermined sequence, said time-coincident corresponding digits of the encoding means being delayed by predetermined amounts so as to be serially delivered to respective summing resistors to thereby establish said predetermined sequence, means for converting each group of time-coincident encoded digits into a quantized pulse amplitude modulated signal which is representative of said group, each pulse amplitude modulated signal comprising $2^N$ quantization levels where N equals the number of video signal channels, means for transmitting the quantized pulse amplitude modulated signals to a remote location, decoding means at said remote location for converting the received pulse amplitude modulated signals into N respective pulse code modulated video signals, means for respectively storing the pulse code modulated digits of each video signal, and means coupled to said storing means for converting the respective pulse code modulated digits into respective N analog signals corresponding to the original N video signals, the number $n$ of pulse code modulated digits per video signal sample capable of being changed to permit the multiplexing of a different predetermined number of video signal channels.

References Cited

UNITED STATES PATENTS

| | | | |
|---|---|---|---|
| 2,807,715 | 9/1957 | Lesti | 328—119 |
| 3,324,237 | 6/1967 | Cherry et al. | 179—15.55 |
| 3,337,691 | 8/1967 | Litchman | 179—15 |

RALPH D. BLAKESLEE, Primary Examiner

A. B. KIMBALL, Jr., Assistant Examiner

U.S. Cl. X.R.

178—6; 179—15.55; 325—38